United States Patent

[11] 3,609,254

[72] Inventor Roland M. Caldwell
Lynchburg, Va.
[21] Appl. No. 884,626
[22] Filed Dec. 12, 1969
[45] Patented Sept. 28, 1971
[73] Assignee H. K. Porter Company, Inc.
Lynchburg, Va.

[54] CURRENT CONDUCTOR SPLICE JOINT
3 Claims, 13 Drawing Figs.
[52] U.S. Cl. .................................................. 191/44.1,
174/92, 191/22, 191/23
[51] Int. Cl. .................................................. B60m 1/24
[50] Field of Search ........................................... 174/5, 92;
238/14.4; 191/22, 23, 29, 30, 44.1, 35; 339/22 R, 22 T

[56] References Cited
UNITED STATES PATENTS
2,994,734 8/1961 Scofield ........................ 191/44.1
3,172,511 3/1965 Hollander ..................... 191/44.1
3,311,715 3/1967 Corl et al. ...................... 191/30
3,325,591 6/1967 Wahl ............................ 174/92
3,475,567 10/1969 Hollander ..................... 191/22 R Primary Examiner—Evon C. Blunk
Assistant Examiner—I. Kenneth Silverman
Attorney—Edelson and Udell ABSTRACT: Proximate end portions of a pair of electrical conductors of generally S-shaped configuration in transverse cross section are jointed in longitudinally aligned end-to-end relation by a connector providing good mechanical and electrical connection between the coupled conductors. The conductors are fitted with U-shaped insulating sheaths which extend along the full length of each conductor and have laterally spaced depending flanges or lips extending freely beyond one longitudinal edge of the conductor. These sheaths, in the regions of the interconnected end portions of the conductors, are cut away to accommodate the above-mentioned connector without, however, destroying the integrity of their channel-forming flanges or lips so that when the conductors are joined together the ends of the sheaths abut one another at the center of the joint and thereby provide the guide channel with continuous smooth surfaces of uninterrupted run of current collector from one conductor to its adjoining conductor. A two-part insulating cover for the splice joint extends over the abutting end portions of the conductor sheaths in such manner as to leave freely exposed the current collector guide channel. Coacting indexing means are provided in the joint cover and conductor sheaths to accurately secure the cover in position against longitudinal displacement thereof relatively to the spliced joint.

PATENTED SEP 28 1971
3,609,254
SHEET 1 OF 2
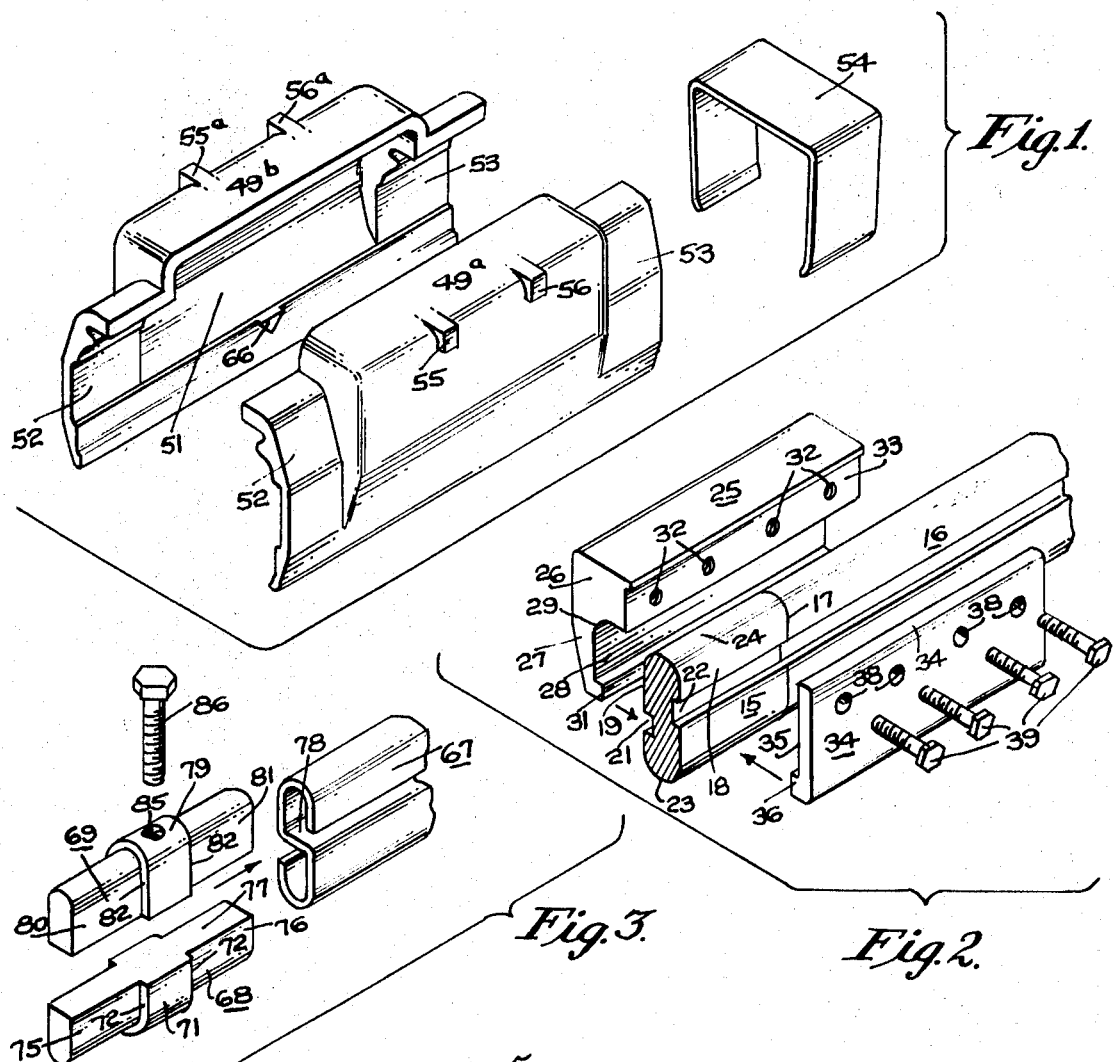
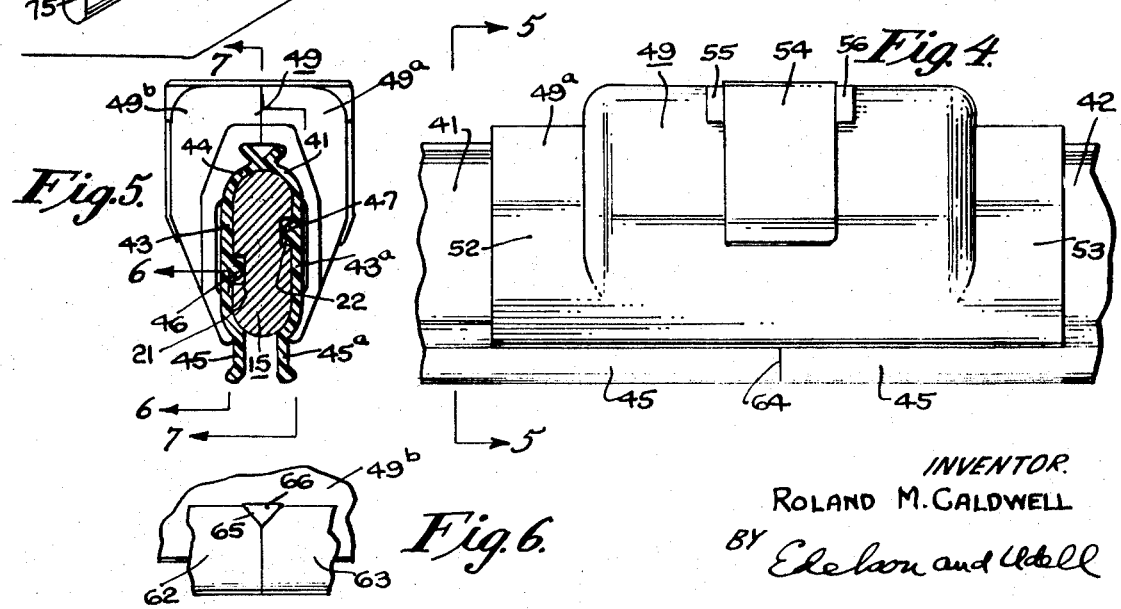
INVENTOR.
ROLAND M. CALDWELL
BY Edelson and Udell
ATTORNEYS.

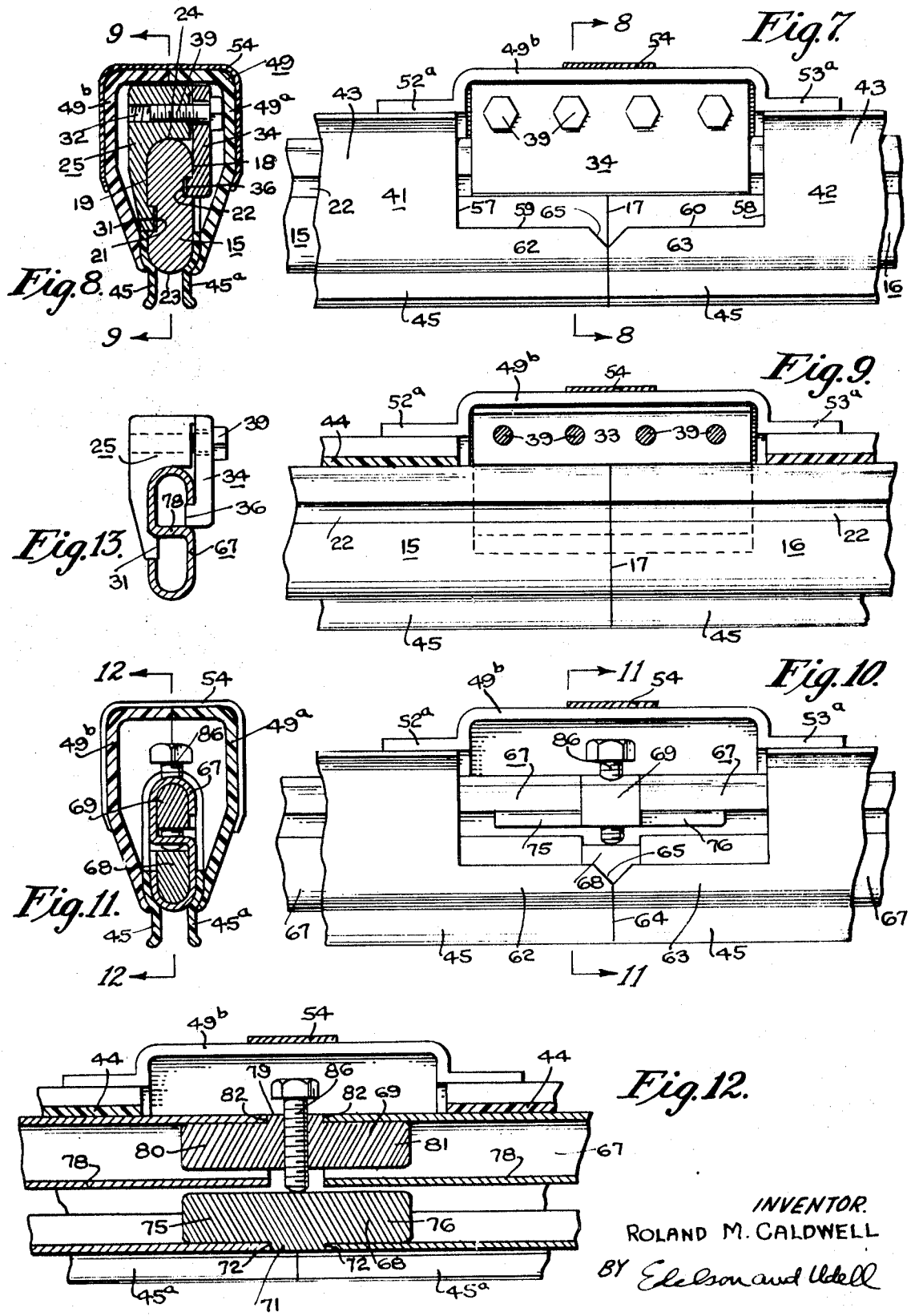

CURRENT CONDUCTOR SPLICE JOINT

It is customary in supplying electrical energy to a moving vehicle or other work utility, such as a traveling crane or an elevator, for example, to provide a stationary conductor bar or rail located adjacent and parallel to the track on which the utility travels so that a current-collecting contactor mounted on the utility may engage the stationary bar, thereby completing a circuit to the electrical apparatus of the utility. The stationary conductor bar must be generally well insulated and, at the same time, have provisions for guiding the current collecting contactor along and in firm, continuous contact with it. In many cases it is necessary to "splice" together two or more conductor bars of conveniently handled lengths in order to furnish electrical power to a utility which must travel along a relatively long track. Such a splice is made by mechanically and electrically joining two similar conductor bars approximately in an end-to-end abutting fashion so as to allow a smooth passage of the current-collecting contactor over the splice joint.

Where it is only necessary to supply a moderate amount of electrical energy to the moving vehicle a "hollow" conductor may be used; that is, one that is formed by rolling or bending a metal strip so that it has a cross section such that it presents an external surface for engagement by the contactor and, at the same time, has a hollow interior into which splicing pins may be inserted for making an internal splice joint between the adjacent ends of two such conductors. Where, however, it is necessary to supply a relatively large amount of electrical energy to the moving vehicle a "solid" conductor must be used. In such a case it is necessary that the splice joint be of an external character.

The insulation for the conductor bar usually comprises a sheath having skirts overlying the opposite sides and top edge of the bar and having laterally spaced lips extending from the skirts to provide guidance for the contactor and to allow it to engage the bottom edge of the conductor. It has been customary to completely terminate such sheaths in the vicinity of the splice joint and to bridge the gap so created by an insulating cover which not only overlies the adjacent ends of the two sheaths but also is provided with a pair of inwardly facing beads in alignment with the contactor guiding lips and having lengths to fit between the spaced ends of the sheath lips, thereby to insure proper guidance of the contactor through the region of the splice joint.

An object, therefore, of the present invention is to provide an insulated splice joint which is applicable to both hollow and solid conductors and in which the insulating splice joint cover is not required to provide contactor guidance.

Another object of the invention is to provide a splice joint cover which is adapted for use in conjunction not only with the splice joint for hollow conductors but also with the splice joint for solid conductors.

The invention applies to insulated splice joints between both hollow and solid conductors, each of which has a generally S-shaped transverse cross section having relatively flat sides and curved edges joining the sides with longitudinal grooves or recesses extending along the full lengths of the sides, these grooves being mutually offset on opposite sides of a central region between the curved edges.

Both the external and internal embodiments of the conductor splicing means of the present invention comprise two-part electrically conductive connectors. In the external splicing means (applicable to both solid and hollow conductors), one connector part is provided with a depending web internally contoured to correspond with the external shape of the conductor sidewall for contact with the corresponding sides of the two abutted conductors and the other connector part has a depending flat web for contact with the opposite sides of the two conductors. Screws inserted through holes of the flat webbed part into threaded holes of the contoured part in a region external of one of the curved conductor edges clampingly secures the two parts about the conductors to complete the joint therebetween. Each of the webs has a longitudinal rib engaging the respective conductor grooves for positively keying the splice joint parts in correct position relatively to their associated conductors.

In the internal splicing means, each of the two connector parts has two legs extending longitudinally in opposite directions from a central shoulder formed integrally therewith, the legs being adapted for longitudinal insertion respectively into corresponding aligned hollow portions of the conductors to be joined. The central shoulders of these parts are of external surface configurations conforming to those of the external surfaces of the conductors, the central shoulder of each connector part being of a depth equal to the thickness of the metal of which the hollow conductors are formed to serve as stops against which the ends of the adjoining conductors abut and to provide smooth surface continuity between the curved bottom edges of the spliced conductors along which the current collecting contractor or shoe travels. A screw threaded through one connector part and against the other connector part forces them respectively into firm mechanical and good electrical contact with the conductors.

The insulation for each of the conductors (both solid and hollow) comprises a U-shaped sheath having opposed sidewalls or skirts and abridging top wall completely enclosing all of the conductor except for its bottom curved edge to be engaged by the moving contactor. This bottom edge is generally protected and yet is accessible to the contactor by means of laterally spaced flanges or lips which depend downwardly from the sidewalls of the sheath as integral extensions thereof to provide an open-bottomed channel extending below the bottom edge of the conductor for protectively receiving and guiding the contactor along the conductor. Both sides of the sheath have internal longitudinal ribs for engagement with the longitudinal conductor grooves to accurately position the sheaths transversely relative to the conductor. In accordance with the present invention, the upper closed portion of the conductor sheath, in the vicinity of the splice joint, is away to an extent sufficient to leave intact the above-mentioned channel-forming flanges or lips and their supporting portions of the sheath sidewalls. The flange-supporting portions of the sheath sidewalls and their associated channel forming flanges or lips extend in the form of relatively narrow strips to the end of the sheath in underlying relation to the splice joint between the conductors so that these extended strips of the sheath of adjoining spliced conductors provide continuous conductor protection and contactor guidance.

The insulating cover for the splice joint comprises two substantially identical members each of which has a hollowed out central body portion to accommodate the splice joint and from which there extend end sections conforming internally substantially in complemental configuration to the external configurations of the sheath skirts which they overlie. Each cover member and its associated lip-supporting strip in the cutaway portions of the insulating sheaths are mutually indexed to effect accurate longitudinal positioning of the cover relative to the abutted sheaths. The two cover members are clamped to one another and to the insulating sheaths by a U-shaped spring clip bridging the body portions of the cover.

For a more specific disclosure of the invention reference may be had to the following detailed description of two illustrative embodiments thereof which is given in conjunction with the accompanying drawings, of which:

FIG. 1 is an exploded perspective view of the insulating splice joint cover and its fastening clip;

FIG. 2 is an exploded perspective view of the external splice joint shown in its relation to solid conductors but adapted also for use with hollow conductors;

FIG. 3 is an exploded perspective view of the internal splice joint specifically for use with hollow conductors;

FIG. 4 is an assembled side view of the splice joint cover and the conductor insulating sheaths;

FIG. 5 is a transverse sectional view taken on the line 5—5 of FIG. 4 showing the assembly of a solid conductor, its insulating sheath and the splice joint cover;

FIG. 6 is a longitudinal sectional view taken on the line 6—6 of FIG. 5 showing the indexing of the insulating sheaths and the splice joint cover;

FIG. 7 is a longitudinal sectional view taken on the line 7—7 of FIG. 5 showing, from the side with one cover member removed, the assembled relation of one connector part of the external splice joint to the spliced conductors and their insulating sheaths;

FIG. 8 is a transverse sectional view taken on the line 8—8 of FIG. 7 showing the assembly of a solid conductor, its external splice joint, the insulating cover and its clamping clip;

FIG. 9 is a longitudinal sectional view taken on the line 9—9 of FIG. 8 showing, from the side with one cover member removed, the assembled relationship of a solid conductor, the other connector part of the external splice joints and the spliced conductors;

FIG. 10 is a side view, with one cover member removed, showing the assembled relationship of the internal splice joint, the spliced conductors and their insulating sheaths;

FIG. 11 is a transverse sectional view taken on the line 11—11 of FIG. 10 showing the assembly of a hollow conductor, its internal splice joint, the insulating cover and its clamping clip;

FIG. 12 is a longitudinal sectional view taken on the line 12—12 of FIG. 11 showing, from the side with one cover member removed, the assembled relationship of the internal splice joint and the spliced hollow conductors; and FIG. 13 is a transverse sectional view showing the application of the external splice joint to hollow conductors.

The terms upper and lower, top and bottom, above and below, and the like, as may appear in the following description, will be understood to be only relative to one another and will be used herein as a matter of descriptive convenience since it is well known that the conductors may be used with substantially any orientation in different installations. Also, reference characters with subscripts "a" designate similar elements of like components.

In FIG. 2 there is shown two aligned solid conductors 15 and 16 with their ends abutted at a junction 17. Both of these conductors are identical so that a description of one will be understood to apply to the other. The conductor 15 has two generally flat parallel sides 18 and 19, into which are respectively formed longitudinal grooves 21 and 22, and two semicircular curved edges 23 and 24. The grooves 21 and 22 are offset in relation to a substantially midway point between the curved edges 23 and 24 so that a transverse cross section of the conductor 15 is generally S-shaped. Such a conductor may be conveniently formed by extruding an electrically conductive material, such as copper or aluminum.

The external splice joint shown in FIG. 2 comprises a two-part connector symmetrically located longitudinally relative to the junction 17 of the two conductors 15 and 16. A first part 25 of the connector has a main body 26; a tapered internally contoured web 27 having a flat interior surface 28 adapted to bear against the upper portion of the conductor flat side 19 and a curved interior surface 29 adapted to envelop at least a portion of the upper curved conductor edge 24; and a longitudinal rib 31 at bottom edge of the web 27 adapted to be seated in the lower conductor groove 21. The major portion of the main body 25 extends above the top curved edges 24 and 24a of the conductors 15 and 16 and has a plurality of tapped holes 32 extending substantially perpendicularly into it from its inner surface 33.

The second part of the two part connector is essentially in the form of a flat web 34 which has an interior surface 35 adapted to bear against the upper portion of the conductor flat side 18 and terminates at its bottom edge with a longitudinal rib 36 adapted to engage the upper conductor groove 22. The top edge 37 of the second connector part web 34 also extends above the top curved edges 24 and 24a of the conductors 15 and 16 and has adjacent to it a plurality of holes 38 in respective alignment with the tapped holes 32 of the first connector part main body 26 and through which may be passed fastening screws 39 for threading into the tapped holes, thereby securely clamping the abutted ends of the conductors 15 and 16 between the two connector parts and, thus, completing the splice joint.

In FIG. 4 the adjoining conductors (not shown) of a completed splice joint as described with reference to FIG. 2 are covered by insulating sheaths 41 and 42 which substantially completely enclose them except in the vicinity of the splice joint as will be described later. These sheaths 41 and 42, as most clearly shown in FIG. 5, are each of substantially inverted U-shape having laterally spaced sidewalls or skirts 43, 43a joined at their top ends by a transversely curved bridging portion 44 which snugly fits over the curved top edge of the conductor upon which the sheath is fitted. The sidewalls or skirts of each sheath terminate in laterally spaced lips 45, 45a which project downwardly beyond the bottom edge of the sheathed conductor to provide an open-ended channel which receives the current collector contact or shoe (not shown) engaging the conductor and guides it in its travel along the exposed bottom edge of the conductor. Longitudinal ribs 46 and 47 are respectively formed on the interior walls of the skirts 43, 43a of the sheath for engagement with the longitudinal grooves 21 and 22 of the conductor 15 so as to accurately position each insulating sheath transversely relative to its associated conductor.

The splice joint itself is enclosed by an insulating cover 49 which is molded of any suitable insulating material in two substantially identical parts 49a and 49b (see also FIG. 1) for assembly on opposite sides of the spliced conductors. Each part of the cover has a centrally located interiorly hollow body section 51 which encloses the splice joint of FIG. 2, for example, and end sections 52 and 53 having internal configurations conforming substantially to the external configurations of the conductor insulating sheaths. The cover is securely closed by a U-shaped spring clip 54 inserted between retaining ears 55–56 and 55a–56a of the respective cover parts 49a and 49b. As may be seen in FIG. 4, the cover 49 extends downwardly only coextensively with the skirts of the insulating sheaths 41 and 42, so as to leave uncovered the depending guide lips 45, 45a of each sheath which normally abut one another at approximately the center of the splice joint assembly.

In FIG. 7, which is a side view of a completed external splice joint with one part of the insulating cover removed, the skirts 43, 43a of each of the insulating sheaths 41 and 42 at their abutting ends are transversely cut, as at 57 and 58, and longitudinally cut, as at 59 and 60, to provide a partial discontinuity in the sheath walls 43, 43a to accommodate the splice joint. The bottom portions of the sheath walls thus remain intact in the form of elongated relatively narrow strips 62 and 63 having squared off ends which may be brought into mutual abutment along a junction line 64 approximately aligned with the junction line 17 of the abutted ends of the conductors 15 and 16.

A generally triangular indexing notch 65 is formed in both sidewalls of each of the conductor sheaths at their junction line 64 by bevelling the upper corners of the abutting ends of the sheath skirt strips 62 and 63. Generally triangular raised indexing keys 66 are formed centrally in the lower portions of each of the splice joint cover parts 49a and 49b, which keys 66 are adapted to mate with the complementally shaped sheath skirt notches 65 (as see FIG. 6) so as to longitudinally lock the cover 49 in accurate position relative to the abutting insulating sheaths 41 and 42 and the conductor bars sheathed thereby.

It will be observed in FIGS. 8 and 9 that when the fastening screws 39 are tightened into the tapped holes 32 in the main body 26 of the splice joint part 25, the two parts 25 and 34 of the external splice joint firmly grip the flat sides 18 and 19 and the tope curved end 24 of the solid conductors with the longitudinal ribs 31 and 36 of the webs 27 and 34 respectively engaged with the longitudinal grooves 21 and 22 of the longitudinally aligned, abutting conductors 15, 16. Also it will be noted that the insulating splice cover 49 does not extend downwardly over the sheath lips 45, 45a to thereby leave the same intact to provide a channel for effecting continuous guidance of the moving contactor, (not shown) which travels between these lips in engagement with the sheathed conductor.

In FIG. 3 the principal elements of a two-part connector for making an internal splice joint between two hollow conductors, such as the conductors 67—67, are shown as comprising two generally similar components 68 and 69. The hollow conductor may be formed by extruding or otherwise shaping any suitable electrically conductive metal, such as aluminum, copper or galvanized steel, to a cross section of S-shaped configuration having substantially the same outside dimensions as the solid conductor above described. The first internal splice joint connector component 68 includes an enlarged central part 71 to provide oppositely facing U-shaped shoulders 72—72 each of a depth substantially equal to the thickness of the metal of which the hollow conductor is formed. The oppositely projecting legs 75 and 76 of the connector component 68 are longitudinally aligned and are each of a dimension and shape as enables the same to be snugly fitted into the bottom hollow portions of the longitudinally aligned conductors 67—67 with the ends of the latter each abutting a shoulder 72 of the connector part 68. The oppositely projecting legs 75, 76 of the connector part 68 are provided with substantially flat upper surfaces 77 which respectively underlie the central webs 78 of the spliced conductors. The central part 71 of the connector component 68 is also provided with a flat top surface which is coplanar with those of the legs 75, 76.

The second internal splice joint component 69 of FIG. 3 is generally similar in shape to that of the connector component 68 in that it too is provided with an enlarged central part 79 having oppositely projecting, longitudinally aligned legs 80, 81 to provide a pair of oppositely facing shoulders 82—82 which respectively serve as abutments for the ends of the conductors which snugly receive in their top hollow portions the oppositely projecting legs of the part 69. This part 69 differs from its associated part, however, in that it is provided in its central part 79 with a tapped hole 85 for receiving a screw 86 the free end of which is adapted to bear against the central flat surface of the coupling part 68 and so cause the oppositely projecting legs of the two splice joint components to be so firmly seated within the hollows of the coupled conductors 67—67 as to securely join the same to provide mechanical and electrical connection therebetween.

FIGS. 10, 11 and 12 show the insulated internal splice joint between the hollow conductors 67—67 made by means of the two-part connector of FIG. 3. In this internal type of splice joint the proximate ends of the conductors 67—67 do not abut one another, instead, they respectively abut the oppositely facing U-shaped shoulders 72—72 and 82—82 of the splice joint components 68 and 69 with the central parts of the latter disposed intermediate the ends of the coupled conductors. The internal splice joint is secured by tightening the screw 86 against the upper flat surface of the lower connector component 68, thereby pressing the legs of the coupling component 68 into firm contact with the interior surfaces of the bottom hollow portions of the conductors and the legs of the coupling component 69 into firm contact with the interior surfaces of the top hollow portions of the conductor. Since the U-shaped shoulder 72—72 of the coupling part 68 are equal in depth to the thickness of the metal of which the hollow conductors 67—67 are formed, the external surface of the central portion of the coupling part 68 disposed between the ends of the coupled conductors is flush with the external surfaces of the coupled conductors and thus provides a continuously smooth surface between the spliced conductors for engagement by the current collector shoe which travels within the channel formed by the lips of the insulating sheaths.

The same conductor insulating sheaths and splice joint cover are used with the internal splice joint of two hollow conductors as those used with the external splice joint of two solid conductors. As in the case of the solid conductor splice joint hereinbefore described with reference to FIGS. 2, 5 and 8, the insulating sheaths 41, 42 for the hollow conductors have the upper corners of their adjoining end portions cut away to accommodate the splice joint components 68, 69 and to provide the elongated sidewall strips which abut one another at the junction line 64 and form the guide channel for the moving collector shoe. The abutting ends of the channel forming sidewall portions of the conductor insulating sheaths are complementally bevelled to provide the indexing notches 65 which respectively receive the mating keys 66 formed in the splice cover parts 49a, 49b for maintaining the splice cover longitudinally centered with respect to the center of the joint which is coincident with the sheath junction line 64.

FIG. 13 indicates the manner in which the external splice joint of FIG. 2 may also be used to join two hollow conductors, such as the hollow conductors 67—67 of FIGS. 3, 10 and 12. The longitudinal internal rib 31 of the coupling part 25 and the internal rib 36 of the coupling part 34 respectively engage the opposite side openings of the hollow conductors so that when the two coupling parts are interconnected by the screws 39 they clampingly engage and secure together in abutting relation the end portions of the coupled hollow conductors. It will be noted that when the external splice joint is used for hollow conductors as described, the adjacent ends of the conductors are abutted directly against one another as in the previously described case of the solid conductors.

The hollow conductors are intended for use where only moderate amounts of electrical energy are required by the moving vehicle and the solid conductors of comparable cross-sectional configurations and dimensions are intended for use principally where relatively large amounts of energy are needed. The external splice joint embodiment of this invention may be used interchangeably with both solid and hollow conductors, while the internal splice joint embodiment is usable only with hollow conductors. The conductor insulating sheaths and the splice joint cover are usable without modification with both external and internal splice joint embodiments and with both solid and hollow conductors.

What is claimed to be new and useful is:

1. An insulating shielding arrangement for covering the exposed joint between a pair of longitudinally aligned electrical conductors joined together in end-to-end relation by splicing means establishing mechanical and electrical continuity therebetween, comprising, in combination, a. a U-shaped insulating sheath for each of said conductors substantially encasing all but one longitudinally extending edge of the conductor throughout substantially the full length thereof and having laterally spaced, substantially parallel depending flanges extending beyond said exposed edge of the sheathed conductor to form a substantially uninterrupted guide channel for a current collector movable along the conductor bottom edge in contact therewith, the sheaths of the spliced conductors being each partially cut away in the regions thereof to be occupied by the said conductor splicing means, the remainder of said sheaths longitudinally adjoining the cut out portions thereof being left substantially intact in the form of elongated strips adapted for end-to-end abutment at a junction line located substantially midway between the opposite ends of said splicing means;

b. an insulating cover for said splice joint comprising two substantially identical members each having a centrally recessed body section substantially coextensive with the partially cutaway portions of said abutted sheaths so that when said cover members are operatively assembled they conjointly provide a hollow interior for accommodating said splicing means, said cover members having side and top wall portions complementally internally shaped in substantial conformity with the external shape of the conductor sheath, said side and top wall portions of said cover members being adapted to conjointly cover the conductor splice means and those portions of the sheaths which immediately adjoin the opposite ends of the splicing means, the lower longitudinal edges of said cover members being respectively coincident with lines extending parallel to but spaced vertically above the bottom edges of the depending channel forming flanges of the conductor sheaths;

c. clamping means for releasably fastening said cover members together in embracing relation with respect to the spliced ends of the sheathed conductors; and d. means for precluding longitudinal displacement of said covers members relatively to said conductor sheaths, said last-mentioned means including an integrally formed key element projecting inwardly from the internal surface of at least one of said cover members for registry with a complementally shaped notch formed in the upper longitudinal edges of said sheath strips at the abutting ends thereof on a side of the joint embraced by said one cover member.

2. An insulated splice joint assembly as defined in claim 1 wherein said registering key element and notch is provided on each of the opposite sides of the spliced conductors at points located substantially midway of the length of the splicing means.

3. An insulated splice joint assembly as defined in claim 1 wherein said key element and notch are each of generally triangular configuration and wherein said notch is conjointly formed by bevel cuts at the upper corners of the abutting ends of said elongated strips of the sheath sidewalls.